3,131,027
PROCESS FOR THE RECOVERY OF HYDROGEN CHLORIDE FROM A VAPOR MIXTURE CONTAINING SAME
Walter L. Borkowski and John J. Van Venrooy, Media, Pa., assignors to Sun Oil Company, Philadelphia, Pa., a corporation of New Jersey
No Drawing. Filed Nov. 7, 1962, Ser. No. 236,122
14 Claims. (Cl. 23—154)

This invention relates to the recovery of hydrogen chloride from vapor streams. More particularly the invention relates to an absorption-desorption process utilizing a particular type of absorbent for separating hydrogen chloride from vapor mixtures such as, for example, mixtures thereof with hydrocarbon and/or chlorohydrocarbon materials.

Numerous processes are known for preparing chlorinated hydrocarbons in which a hydrocarbon feed, particularly a gaseous hydrocarbon, is reacted with elemental chlorine or a metal halide capable of reduction to a lower valence state such as ferric chloride or cupric chloride. It is characteristic of these processes that HCl is formed in the reaction and leaves the reaction zone in admixture with the chlorinated products and unreacted hydrocarbon. The conventional procedure for recovering HCl from the reaction mixture involves absorbing the HCl in an aqueous hydrochloric acid solution having the approximate composition of the azeotropic mixture (22% HCl by weight) and then stripping the absorbed HCl from the rich absorption medium. A process involving such procedure has been described in Chem. Eng. Progress, December 1960, pages 67–73.

Recovery of HCl in the conventional manner utilizing aqueous hydrochloric acid as absorption medium requires the use of special materials of construction due to the corrosive nature of the acid. Generally graphite towers are employed for the absorption and stripping zones, and the associated equipment, such as pumps, condensers and piping, is constructed of special acid-resistant alloys. Such requirements add considerably to the cost of a recovery plant.

The present invention provides an HCl-recovery process which does not involve the use of aqueous hydrochloric acid and hence does not require special corrosion-resistant materials of construction.

According to the invention HCl is recovered from vapor mixtures by contacting the same at a relatively low temperature with a solid absorbent containing ferric oxychloride or hydrated ferric oxychloride to selectively absorb the HCl. When the absorbent becomes substantially saturated with HCl, contact of it with the feed mixture is stopped and the absorbent is then heated to a relatively high temperature above 100° C. and at least 25° C. above the temperature used during the contacting step and more preferably at least 50° C. thereabove. This causes HCl to be evolved from the absorbent and regenerates the absorbent for reuse in the process.

The efficacy of the present process in effecting recovery of HCl from vapor mixtures is the result of a reaction which, as we have discovered, can readily be reversed by variation of temperature. The precise reaction is not known with certainty but it is thought to be as follows:

As shown by the equation hydrated ferric oxychloride, represented by the formula $Fe_2Cl_3(OH)_3$, reacts with HCl to form a hydrated ferric chloride which, at higher temperature, will evolve HCl vapor and revert back to the original form. The hydrated ferric oxychloride can also be represented by the formulas $Fe(OH)Cl_2 \cdot FeOCl \cdot H_2O$ and $Fe(OH)Cl_2 \cdot Fe(OH)_2Cl$ When ferric oxychloride is employed in the process, the reaction is thought to proceed in a manner that can be represented as follows:

When the feed gas contains moisture, unhydrated ferric oxychloride probably converts to a hydrated form during the operation so that the reaction thereafter proceeds according to the first equation shown. The foregoing explanation may be an over-simplification of what actually occurs in the process and the reactions that take place may be more complex. In any event the process is operative when any solid absorbent is used that contains a ferric oxychloride component, whether hydrated or unhydrated.

The process can be practiced with wide variation of the temperature levels for both the absorption step and the desorption step provided that the desorption temperature is sufficiently higher than the absorption temperature. As previously indicated the temperature differential between the two steps should be at least 25° C., more preferably at least 50° C., and the desorption should be effected at a temperature of at least 100° C. A general overall temperature range for the operation is 20° C. to 300° C. The capacity of the absorbent for holding HCl increases as the temperature is lowered and decreases as the temperature is raised. Hence many combinations of minimum and maximum temperatures in the absorption-desorption cycle can be selected for practicing the process. For example the absorption can be done at a temperature of 75° C. or below and the desorption at a temperature of 125° C. or higher; or the two temperature levels can be, respectively, 150° C. and 225° C. Selection of the optimum temperature depends to some extent upon the manner in which the absorbent was prepared and the particular form thereof obtained.

The ferric oxychloride for use in the process can be prepared in several ways. One way involves the use of a reactive ferric oxide, by which is meant ferric oxide formed by hydrolyzing a water-soluble ferric salt and removing water without heating excessively. Ferric oxide which has been calcined, and which is sometimes referred to as "ignited" ferric oxide, is too unreactive with HCl for the present purpose. For practicing the process the reactive type of ferric oxide can be charged to the absorption zone and the feed gas containing HCl fed into the zone at the temperature at which the absorption step is to be conducted. Contact of the HCl with the ferric oxide first converts it to ferric oxychloride which then absorbs additional HCl in the manner indicated in the equations shown above. Subsequent heating of the absorbent drives off the HCl and converts it back to ferric oxychloride which can then be used in the next cycle of the process.

The starting material which is converted to ferric oxy chloride need not be pure $Fe_2O_3$ but can be any of the complex forms thereof such as various types of iron ores. For example, bog ores in which part of the iron is in the hydroxide form can be used. Another example is taconite, $FeO:Fe_2O_3$, which will react with HCl during the first cycle of the process to produce a complex which can be represented as $FeCl_2 \cdot Fe_2Cl_6 \cdot XH_2O$. Heating of this material to evolve HCl will convert the material to ferric oxychloride associated with ferrous chloride. Thereafter the ferric oxychloride component of the material will function in the same manner as previously described in the absorption and subsequent desorption of HCl and the ferrous chloride will remain unchanged during the cycle. When this form of absorbent is employed, it is preferred to operate the absorption step at a temperature in the range of 100–200° C. and the desorption step at a temperature that is at least 50° C. higher.

Still another example of a suitable ore is siderite, $FeCO_3$, which will convert to hydrated ferrous chloride upon contact with the HCl-containing vapor feed and further convert to ferric oxychloride when the hydrated ferrous chloride is heated sufficiently in the presence of $O_2$.

The ferric oxychloride absorbent can also be obtained from either $FeCl_2$ or $FeCl_3$. In the case of the ferrous salt, it can be charged to the reactor and then treated with a mixture of HCl and $O_2$ to form FeOCl hydrate. Thereafter introduction of the HCl-containing feed will produce hydrated ferric chloride which will become ferric oxychloride after heating to evolve HCl. When anhydrous $FeCl_3$ is used as the starting material, care must be exercised in charging the absorber since the $FeCl_3$ tends to absorb moisture from the air and may become a sticky mass. However, if the $FeCl_3$ is introduced into the absorber in dry form, it is possible to convert it to FeOCl by maintaining it at an elevated temperature and passing an inert gas containing a suitable amount of moisture into the mass until substantially all the $FeCl_3$ has been converted. However this procedure also involves the risk of developing a tacky condition with resultant fusion of the $FeCl_3$ particles into a mass. Hence, if $FeCl_3$ is to be used, it is preferred to prepare the absorbent utilizing an inert granular carrier material such as pumice, graphite, silica gel, diatomaceous earth, fireclay, alumina gel or the like. The $FeCl_3$ is dissolved in water, the solution is admixed with a suitable amount of carrier and the water is evaporated. With the water present the $FeCl_3$ is in the form of a hexahydrate but evaporation causes hydrolysis thereof resulting in the formation of ferric oxychloride. When dry the absorbent material is in the form of ferric oxychloride distended on the inert carrier.

There are various complex salts formed by ferric chloride with the chlorides of the metals of groups I and II of the periodic table, and these can also be used in preparing the absorbent. For example, the complex salts of NaCl, KCl, $BaCl_2$ or $CaCl_2$ with ferric chloride which complexes contain one mole of water of hydration can be employed. When such complexes are heated, HCl is evolved and the iron component of the complex is converted to ferric oxychloride which then can be used to absorb HCl from the feed vapor. Use of these complex salts is advantageous in that it results in reduction of the volatility of ferric chloride and prevents possible loss of it from the system due to vaporization.

The complex salts can be prepared by dissolving ferric chloride and the alkali or alkaline earth metal chloride in water and then heating the solution to evaporate water. The other metal chloride is used preferably in amount of 1–2 moles per mole of ferric chloride and preferably is an alkali metal chloride such as NaCl or KCl. After being dried the residue can be disintegrated into granular form and then used as the absorbent. Alternatively, a granular inert support such as those specified above can be added to the aqueous solution of the metal salts so that, upon drying, the complex salt will be distended on the inert support material. When using such complex salts to supply the ferric oxychloride absorbent component, the process generally can be operated efficiently at temperature levels that are lower than those preferred when other forms of the absorbent are used, for example, at 75° C. or below for absorption and 125° C. or above for desorption.

When the process is practiced with the absorbent in the form of a stationary bed, means must be provided for heating the absorbent following the absorption step and for cooling the mass after the desorption step. The process can also be carried out with separate absorption and desorption zones in each of which the absorbent is maintained in the form of a moving bed. Operation of the process in this manner requires the provision of suitable means for transporting the absorbent between the zones and for heating and cooling it therebetween.

The alternate absorption and desorption of HCl in the process can be augmented by varying the pressure between the steps. We have found that at a given temperature level the amount of HCl which can be held by the absorbent varies with the HCl partial pressure adjacent the absorbent and increases as the HCl partial pressure increases. Hence, if the feed mixture is contacted with the absorbent under elevated pressure, the absorption of HCl will be facilitated. On the other hand, if the desorption is done at relatively low pressure, removal of HCl from the absorbent will be expedited. The benefit of this pressure effect can, if desired, be taken advantage of in the process by contacting the absorbent with the vapor feed at a pressure such that the partial pressure of HCl in the vapor is higher than the pressure adjacent the absorbent during the subsequent heating step.

The following examples show the absorptive-desorptive action of illustrative absorbents in accordance with the invention:

EXAMPLE I

In this example a supported complex salt comprising ferric oxychloride and potassium chloride was used as the absorbent. Preparation of the absorbent involved mixing 60 ml. of water with 81.5 g. of $FeCl_3 \cdot 6H_2O$ (0.3 mole), 22.6 g. of KCl (0.3 mole), 30 ml. of concentrated hydrochloric acid and 75 g. of silica gel. The wet granular mixture was blown with nitrogen at 40–50° C. and then heated to 150° C. to remove excess water and HCl. The dried mixture was placed in a column provided with an electric heating coil and having inlet and outlet lines attached to gas meters. The absorbent was used in ten successive cycles of operation. In each cycle a stream of gaseous HCl was first passed into the absorbent at about room temperature until the absorbent became saturated with HCl as shown by identical meter readings on the inlet and outlet. Upon first introducing the HCl no flow out of the column was obtained, and subsequently effluent flow appeared and gradually increased until the meter readings became the same indicating that no further absorption of HCl was occurring. Then introduction of HCl was stopped, heat was applied to the column and nitrogen was passed into it at an approximately constant rate while the temperature of the absorbent increased. At intervals the absorbent temperature and the inlet and outlet meter readings were noted. The effluent gas was passed into a caustic soda solution to absorb the HCl and the amount absorbed was thereafter ascertained by back titration. Table I shows the results obtained during desorption in the first cycle of operation.

*Table I*

| Desorption time, minutes | Absorbent temperature, ° C. | Meter readings | |
|---|---|---|---|
| | | In | Out |
| (Start) | 58 | 3.1 | 3.5 |
| 22 | 65 | 3.0 | 3.0 |
| 142 | 87 | 3.0 | 4.0 |
| 162 | 104 | 3.0 | 7.4 |
| 262 | 116 | 3.0 | 9.2 |
| 277 | 117 | 3.0 | 8.0 |
| 302 | | 3.0 | 6.0 |
| 312 | 124 | 3.0 | 6.0 |
| 347 | 126 | 3.0 | 3.0 |

The meter readings listed are in arbitrary units but are comparative for indicating relative flow rates. The data indicate that little desorption of HCl occurred up to a temperature as high as 87° C. but that the desorption rate was substantial by the time the temperature had reached 104° C. Eventually the inlet and outlet flow rates became the same showing that no further removal of HCl from the absorbent was occurring. The amount of HCl in the total effluent during the cycle was found to be 0.45 mole, which corresponds to 1.5 moles of HCl per mole of the complex salt.

Three further cycles were carried out in approximately the same way as the first one described above. Then four cycles were made in which the total cycle time was shortened from the previously used 4–6 hour period to about one hour by reducing the time the heated desorbent was blown with nitrogen. Finally two more cycles were made in which the desorption time was lengthened to give a total cycle time of about two hours. The amounts of HCl recovered for the various cycles are shown in Table II.

*Table II*

| Cycle No. | Approximate total cycle time, hrs. | Hcl recovered, moles |
|---|---|---|
| 1 | 4–6 | 0.45 |
| 2 | 4–6 | 0.42 |
| 3 | 4–6 | 0.41 |
| 4 | 4–6 | 0.43 |
| 5 | 1 | 0.10 |
| 6 | 1 | 0.08 |
| 7 | 1 | 0.08 |
| 8 | 1 | 0.13 |
| 9 | 2 | 0.43 |
| 10 | 2 | 0.43 |

The data show that about the same amounts of HCl were recovered in the 9th and 10th cycles as in the earlier cycles which utilized longer desorption times. This indicates that a 2-hour cycle time provided as long a desorption period as is required to recover about the maximum amount of HCl per cycle for the temperature levels used but that a 1-hour cycle time was too short. Comparison of cycles 9–10 with cycles 1–4 shows that substantially no deterioration in quality of the absorbent occurred and that it can be continuously reused for extended periods in a cyclic operation.

EXAMPLE II

The same apparatus was used as in the preceding example but in this case the absorbent was prepared in situ in the column from a synthetic ferrosoferric oxide $$(FeO \cdot Fe_2O_3)$$

A mixture of 10.15 g. of the ferrosoferric oxide and 10.0 g. of diatomaceous earth was made and added to the column, and the mixture was then treated at 200° C. with gaseous HCl until no further absorption occurred. HCl was then purged from the absorbent by passing nitrogen through the column at 200° C. This procedure resulted in the absorbent being in the form of ferric oxychloride in combination with ferrous chloride, with the ferric oxychloride component being equivalent to 0.088 mole of FeOCl. The column was cooled to room temperature and HCl was passed into it until no further absorption of HCl occurred. The column was then heated to 200° C. and nitrogen was passed through it. Initially HCl desorption occurred rapidly and thereafter progressively decreased. While at the end of one hour meter readings indicated that little further desorption of HCl was occurring, purging with nitrogen was continued for a total of about 6 hours. It was found that the total amount of HCl desorbed was 0.095 mole or in other words slightly in excess of one mole per mole of FeOCl in the column.

EXAMPLE III

In another run, when the naturally occurring ore, taconite, was substituted for the ferrosoferric oxide used in the previous example, substantially similar results were obtained.

We claim:

1. Method for recovering hydrogen chloride from a vapor mixture containing hydrogen chloride which comprises contacting the vapor mixture at a relatively low temperature with a solid absorbent comprising a ferric component selected from the group consisting of ferric oxychloride and hydrated ferric oxychloride, whereby hydrogen chloride is selectively absorbed, heating the absorbent to a temperature above 100° C. and at least 25° C. higher than said relatively low temperature but less than 300° C. and recovering hydrogen chloride evolved therefrom.

2. Method according to claim 1 wherein said vapor mixture mainly comprises hydrocarbon and chlorohydrocarbon materials.

3. Method according to claim 1 wherein the absorbent is a combination of said ferric component and a chloride of a metal selected from group I metals and group II metals.

4. Method according to claim 3 wherein said metal is an alkali metal.

5. Method according to claim 4 wherein said vapor mixture is contacted with the absorbent at a temperature below 75° C. and the absorbent is then heated to a temperature above 125° C.

6. Method according to claim 1 wherein the absorbent is a combination of said ferric component and ferrous chloride.

7. Method according to claim 6 wherein said relatively low temperature is in the range of 100–200° C. and the absorbent is heated to a temperature at least 50° C. higher than said relatively low temperature.

8. Method of recovering hydrogen chloride from a vapor mixture comprising hydrocarbon and chlorohydrocarbon material in admixture with hydrogen chloride which comprises contacting the vapor mixture at a temperature below 100° C. with a solid absorbent comprising a ferric component selected from the group consisting of ferric oxychloride and hydrated ferric oxychloride, whereby hydrogen chloride is selectively absorbed, heating the absorbent to a temperature in the range of 125–300° C. and recovering hydrogen chloride evolved therefrom.

9. Method according to claim 8 wherein the absorbent is heated to a temperature in the range of 150–250° C.

10. Method according to claim 8 wherein the vapor mixture is contacted with the absorbent at a pressure such that the partial pressure of hydrogen chloride in the mixture is higher than the pressure adjacent the absorbent during the subsequent heating step.

11. Method for recovering hydrogen chloride from a vapor mixture containing the same which comprises contacting the vapor mixture at a relatively low temperature with a solid absorbent comprising a ferric component selected from the group consisting of ferric oxychloride and hydrated ferric oxychloride and a non-ferric component selected from the group consisting of group I metal chlorides and group II metal chlorides, whereby hydrogen chloride is selectively absorbed, heating the absorbent to a temperature above 100° C. and at least 25° C. higher than said relatively low temperature and recovering hydrogen chloride evolved from the absorbent, said vapor mixture being contacted with the absorbent at a pressure such that the partial pressure of hydrogen chloride in the mixture is higher than the pressure adjacent the absorbent during the subsequent heating step.

12. Method according to claim 11 wherein said vapor mixture is contacted with the absorbent at a temperature below 75° C. and the absorbent is then heated to a temperature above 125° C.

13. Method for recovering hydrogen chloride from a vapor mixture containing the same which comprises contacting the vapor mixture at a relatively low temperature with a solid absorbent comprising a ferric component selected from the group consisting of ferric oxychloride and hydrated ferric oxychloride together with ferrous chloride, whereby hydrogen chloride is selectively absorbed, heating the absorbent to a temperature above 100°

C. and at least 25° C. higher than said relatively low temperature and recovering hydrogen chloride evolved from the absorbent, said vapor mixture being contacted with the absorbent at a pressure such that the partial pressure of hydrogen chloride in the mixture is higher than the pressure adjacent the absorbent during the subsequent heating step.

14. Method according to claim 13 wherein said relatively low temperature is in the range of 100–200° C. and the absorbent is heated to a temperature at least 50° C. higher than said relatively low temperature.

References Cited in the file of this patent

UNITED STATES PATENTS 3,067,009     Murib _____ Dec. 4, 1962

OTHER REFERENCES

J. W. Mellor's, "A Comprehensive Treatise on Inorganic and Theoretical Chem.," volume 14, 1935 Edition, pages 72–75, Longmans, Green & Co., New York.